Sept. 30, 1952     M. G. NICHOLSON, JR     2,612,603

SIGNAL-TO-NOISE RATIO IN PULSE RECEPTION

Original Filed July 18, 1945

INVENTOR
Madison G. Nicholson Jr.
BY C. A. Norton
ATTORNEY

Patented Sept. 30, 1952

2,612,603

UNITED STATES PATENT OFFICE 2,612,603

SIGNAL-TO-NOISE RATIO IN PULSE RECEPTION

Madison G. Nicholson, Jr., Snyder, N. Y., assignor to Sylvania Electric Products Inc., a corporation of Massachusetts Continuation of application Serial No. 605,691, July 18, 1945. This application December 15, 1951, Serial No. 261,779

9 Claims. (Cl. 250—20)

1

This invention relates to radio reception of pulses recurring at a periodic rate, of the nature employed, for example, in radar.

The present application is a continuation of applicant's co-pending application, Serial No. 605,691, filed July 18, 1945, now abandoned, entitled Signal-to-Noise Ratio in Pulse Reception, and assigned to the same assignee as the present application.

It is an object of this invention to provide a method and apparatus for improving the signal-to-noise ratio in the reception of pulses transmitted at a periodic rate.

It is a further object of this invention to provide apparatus of the class described in which the voltages corresponding to the desired pulses may be added at one rate while voltages of random noise and static are added at a smaller rate.

It is still a further object of this invention to provide a method and apparatus for adding pulse voltages in an arithmetical manner while adding voltages corresponding to random noise and static in a root-mean-square manner.

Still further objects and advantages of my invention will be apparent from the specification.

Figure 1:
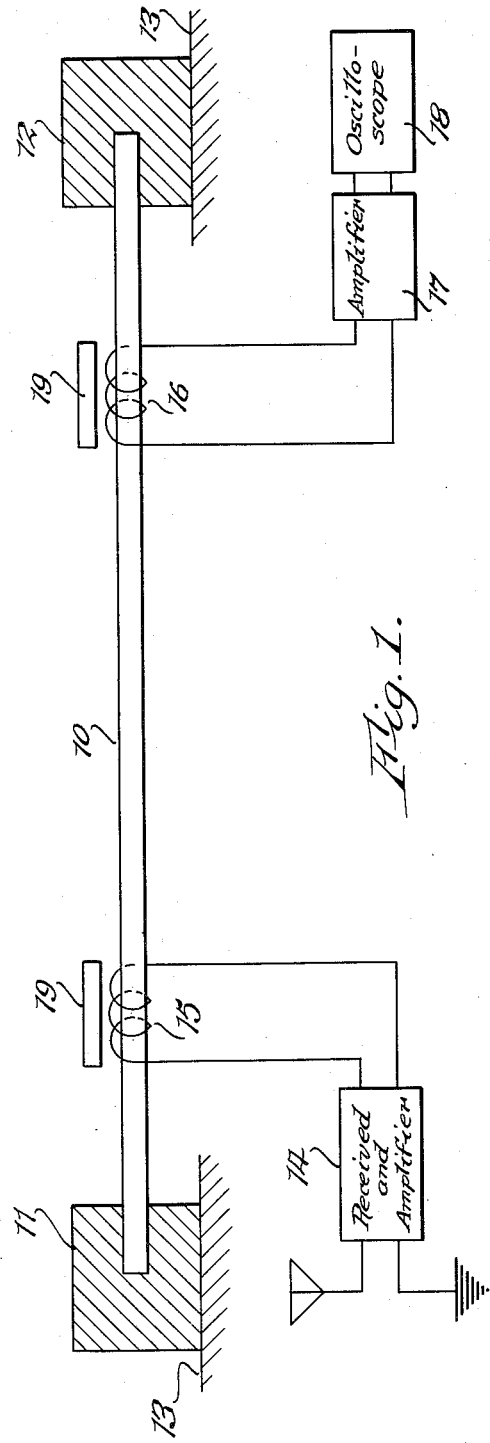
Figure 2:
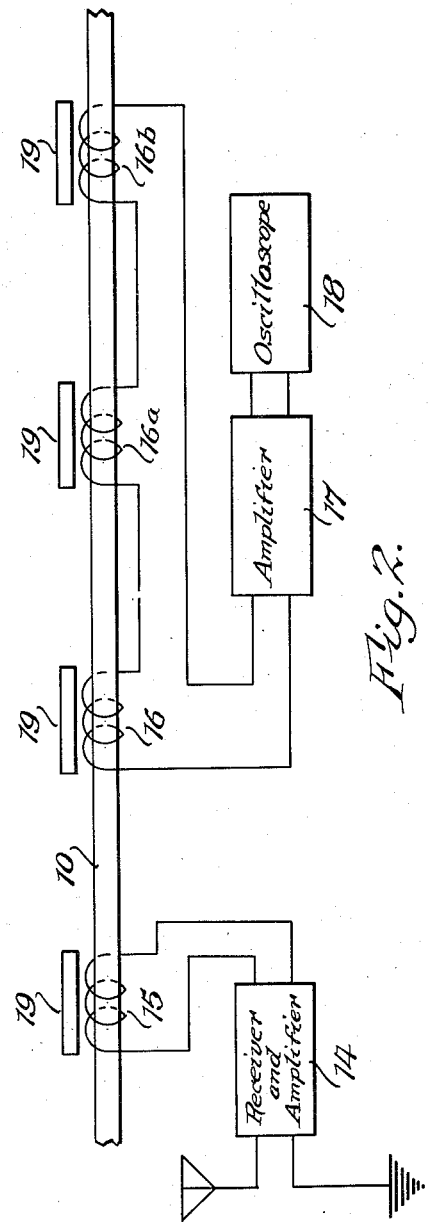

The features of novelty which I believe to be characteristic of my invention are set forth with particularity in the appended claims. My invention itself, however, both as to its fundamental principles and as to its particular embodiments, will best be understood by reference to the specification and accompanying drawing, in which:

Fig. 1 is a circuit diagram of one form of apparatus in accordance with my invention, and Fig. 2 is a similar diagram of a modified form of apparatus in accordance with my invention.

Referring now more particularly to Fig. 1, 10 represents a rod or bar having magnetostrictive properties. This bar may be imbedded at opposite ends in masses 11 and 12, supported on any suitable support 13, which masses may be sufficiently heavy and rigid so as to cause reflection of magnetostriction waves traveling lengthwise in bar 10.

Reception of the desired pulses may be accomplished by receiver and amplifier 14, provided with the usual antenna and ground, and the output pulses may be supplied to coil 15 surrounding rod 10. Also surrounding rod 10, but displaced from coil 15, I may provide coil 16, the output of which feeds the input circuit of amplifier 17, and the output of which is impressed on any suitable indicator, such as oscilloscope 18. Magnets 19 will be associated with each coil in

2 the usual manner for the purpose of impressing a magnetic field upon rod 10.

The operation of my invention may now be understood. The pulses received by the receiver recur at regular intervals at a predetermined fixed rate. Each pulse sets up a magnetostriction wave in rod 10, and this wave travels in both directions from coil 15, one wave proceeding toward coil 16 and the other toward mass 11. As the wave passes through coil 16, a voltage will be set up in this coil which will be amplified in amplifier 17 and indicated on oscilloscope 18. This wave will continue to travel until it reaches mass 12, whereupon it will be reflected back toward coil 16, and on passing through coil 16 will again produce a voltage therein which will be impressed upon the amplifier and indicated by the oscilloscope.

In a similar manner, the wave traveling from coil 15 toward mass 11 will reach mass 11 and will be reflected back to coil 15, and will pass down the rod to coil 16, thereby producing a voltage therein, will continue on to mass 12, and will be reflected from there back toward coil 16. Thus it will be seen that each received pulse sets up a wave, and these waves travel back and forth on rod 10 until their energy is dissipated.

By choosing the distance from coil 15 to mass 11 so that it is exactly equal to the distance of travel of the magnetostriction wave during the time interval between pulses, it will be seen that the wave produced by the first pulse received arrives at mass 11 just as the second pulse is being received, and arrives back at coil 15 just as the third pulse is being received and is reinforced by the third pulse.

The distance from coil 15 to mass 12 is likewise so related to the time rate of the pulses that each wave reflected from mass 12 arrives at coil 15 at the same time that this coil is impressing, through a received pulse, another wave in the rod. From this time on the wave generated by each incoming pulse is added to the wave from a preceding pulse which has been reflected from one of the masses 11 or 12.

In the example given, the distance from coil 15 to mass 11 might be the length of travel of a wave during the time interval between two successive pulses. The distance from coil 15 to mass 12 might be the same distance or any whole multiple thereof. Coil 16 may be positioned at any point on rod 10, and varying its position with respect to the length of the rod serves to introduce a time delay which may be varied by shifting coil 16, as described and claimed in my earlier application, Serial No. 541,743, now Patent No. 2,401,094, granted May 28, 1946.

By operating in the manner described, a definite improvement in signal-to-noise ratio can be obtained. The reason for this is that the voltages produced by the various waves when the distances are chosen as above indicated add arithmetically, whereas random noise and static does not add arithmetically, but as root-mean-square. This phenomenon is analogous to the reduction of dust and dirt marks and grain in a motion picture projected at the intended speed as compared with the marks on any individual frame projected as a still picture. The less the attenuation in rod 10, the greater the improvement which can be realized.

Referring now more particularly to Fig. 2, I have shown a modified form of my invention, like reference numbers designating like parts as in Fig. 1. This figure differs from Fig. 1 in that, instead of one output coil, a number may be provided; for instance, 16, 16a, 16b, and more, if desired. All of these are preferably connected in series and in the input of amplifier 17, and the distance between each coil and the next is made such that it is equal to the distance traveled by the wave in rod 10 in the time between two successive pulses or any whole multiple thereof.

In this way, while the wave produced by the first pulse is passing through coil 16b and generating a voltage therein, the wave produced by the second pulse is passing through coil 16a and generating a voltage therein, and the wave produced by the third pulse is passing through coil 16 and generating a voltage therein.

The reflected action of the waves is the same as described with reference to Fig. 1, and the explanation, therefore, is not repeated. In the same manner, as already described, the voltages generated by the desired pulses add arithmetically, whereas the voltages generated by random noise and static add as root-mean-square and, therefore, a substantial improvement in signal-to-noise ratio is obtainable.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

What I claim is:

1. Apparatus for improving the signal-to-noise ratio in the reception of pulses transmitted with a predetermined substantially uniform periodicity comprising, in combination, a magnetostrictive member of elongated configuration having at least one reflecting end termination, a magnetostrictive wave induced in said member traveling a predetermined distance therein in the time interval between the initiation of successive ones of said pulses, means spaced from said one end termination by a whole multiple, including one, of one half of said distance for impressing magnetostrictive waves in said member corresponding to each pulse received, and means responsive to impressed and reflected waves in said member for producing output pulse voltages.

2. Apparatus for improving the signal-to-noise ratio in the reception of pulses transmitted with a predetermined substantially uniform periodicity comprising, in combination, a magnetostrictive member of elongated configuration having at least one reflecting end termination, a magnetostrictive wave induced in said member traveling a predetermined distance therein in the time interval between the initiation of successive ones of said pulses, means spaced from said one end termination by a whole multiple, including, of one half of said distance for impressing magnetostrictive waves in said member corresponding to each pulse received, and means spaced from said first mentioned means by a whole multiple, including one, of said distance for picking up from said member a voltage corresponding to each pulse received.

3. The combination claimed in claim 2, in which said pickup means comprises a plurality of series connected coils longitudinally spaced along said member at points spaced from each other and from said first mentioned means, the distance between any two successive ones of said points being equal to a whole multiple, including one, of said wave-travel distance.

4. Apparatus for improving the signal-to-noise ratio in the reception of pulses transmitted with a predetermined substantially uniform periodicity comprising, in combination, a magnetostrictive member of elongated configuration having reflecting end terminations, a magnetostrictive wave induced in said member traveling a predetermined distance therein in the time interval between the initiation of successive ones of said pulses, means spaced from one of said end terminations by a whole multiple, including one, of one half of said distance for impressing magnetostrictive waves in said member corresponding to each pulse received, means spaced from said first mentioned means by a while multiple, including one, of said distance for picking up from said member a voltage corresponding to each pulse received, the length of said member being selected such that the other of said end terminations is spaced from said second mentioned means by a whole number, including one, of one half of said distance.

5. The combination claimed in claim 4, in which said pickup means comprises a plurality of series connected coils longitudinally spaced along said member with an individual spacing from said first mentioned means and from each other equal to said wave-travel distance.

6. Apparatus for improving the signal-to-noise ratio in the reception of pulses transmitted with a predetermined substantially uniform periodicity comprising, in combination, a magnetostrictive member of elongated configuration having at least one reflecting end termination, a magnetostrictive wave induced in said member traveling a predetermined distance therein in the time interval between the initiation of successive ones of said pulses, a pulse input coil surrounding said member and spaced from said one end termination by a whole multiple, including one, of one half of said distance for impressing magnetostrictive waves in said member corresponding to each pulse received, and a pickup coil surrounding said member and spaced from said input coil a whole multiple, including one, of said distance to have induced in said pickup coil a voltage corresponding to each pulse received.

7. Apparatus for improving the signal-to-noise ratio in the reception of pulses transmitted with a predetermined substantially uniform periodicity comprising, in combination, a magnetostrictive member of elongated configuration, means positioned on each end of said member for causing said member to have reflecting end terminations, a magnetostrictive wave induced in said member traveling a predetermined distance therein in the time interval between the initiation of successive ones of said pulses, means spaced from one of said end-termination means by a whole multiple, including one, of one half of said distance for impressing magnetostrictve waves in said member corresponding to each pulse received, means spaced from said first mentioned means by a whole multiple, including one, of said distance for picking up from said member a voltage corresponding to each pulse received, the length of said member being selected such that the other of said end-termination means is spaced from said second mentioned means by a whole number, including one, of one half of said distance.

8. Apparatus for improving the signal-to-noise ratio in the reception of pulses transmitted with a predetermined substantially uniform periodicity comprising, in combination, a magnetostrictive member of elongated configuration having at least one reflecting end termination, a magnetostrictive wave induced in said member traveling a predetermined distance therein in the time interval between the initiation of successive ones of said pulses, means spaced from said one end termination by a whole multiple, including one, of said distance for impressing magnetostrictive waves in said member corresponding to each pulse received, and means spaced from said first mentioned means by a whole multiple, including one, of said distance and responsive to impressed and reflected waves in said member for producing output pulse voltages.

9. Apparatus for improving the signal-to-noise ratio in the reception of pulses transmitted with a predetermined substantially uniform periodicity comprising, in combination, a magnetostrictive member of elongated configuration having reflecting end terminations, a magnetostrictive wave induced in said member traveling a predetermined distance therein in the time interval between the initiation of successive ones of said pulses, means spaced from one of said end terminations by a whole multiple, including one, of said distance for impressing magnetostrictive waves in said member corresponding to each pulse received, means spaced from said first mentioned means by a whole multiple, including one, of said distance and responsive to impressed and reflected waves in said member for producing output pulse voltages, the length of said member being selected such that the other of said end terminations is spaced from said second mentioned means by a whole multiple, including one, of said distance.

MADISON G. NICHOLSON, Jr.

REFERENCES CITED

The following references are of record in the file of this patent:

UNITED STATES PATENTS

| Number | Name | Date |
|---|---|---|
| 1,561,278 | Pupin | Nov. 10, 1925 |
| 2,318,417 | Phelps | May 4, 1943 |
| 2,401,094 | Nicholson, Jr. | May 28, 1946 |
| 2,401,416 | Eaton et al. | June 4, 1946 |
| 2,495,740 | Labin et al. | Jan. 31, 1950 |

FOREIGN PATENTS

| Number | Country | Date |
|---|---|---|
| 490,864 | Germany | Feb. 8, 1930 |